United States Patent [19]
Webb et al.

[11] Patent Number: 5,514,403
[45] Date of Patent: May 7, 1996

[54] METHOD OF SUBSTANTIALLY REDUCING HAZARDOUS PATHOGENS ON THE SURFACE OF FOOD PRODUCTS

[76] Inventors: Neil B. Webb, 4019 Glen Laurel Dr., Raleigh, N.C. 27612; Jonathan N. Webb, 8203 Maple Leaf Ct., Indianapolis, Ind. 46268; Wayne P. Pruett, Jr., 10001 Kilnstone Dr., Raleigh, N.C. 27613

[21] Appl. No.: 317,470

[22] Filed: Oct. 4, 1994

[51] Int. Cl.$^6$ ................................. A23L 3/00; A61L 2/00
[52] U.S. Cl. ........................... 426/511; 422/26; 426/521
[58] Field of Search ........................... 426/511, 521, 426/327; 99/470; 422/26; 165/2; 452/77, 81

[56] References Cited

U.S. PATENT DOCUMENTS 3,548,737  12/1970  Evans ........................................ 426/521

*Primary Examiner*—George Yeung
*Attorney, Agent, or Firm*—John G. Mills and Associates

[57] ABSTRACT

This invention is a method of substantially reducing and in some cases eliminating hazardous pathogens form the surfaces of food products. This is accomplished by moving the meat products into a treatment area and spraying the same with super heated steam preferably heated to between 250 and 300 degrees Fahrenheit for a period of 1 to 5 seconds depending on the food product being treated. The surfaces of the food products are then immediately cooled by applying a chilled fluid having a temperature of between 35 and 40 degrees Fahrenheit for a period of 5 to 10 seconds. Even though the super heated steam substantially reduces or eliminates hazardous pathogens on the surface of the food products, the cooling fluid allows such surface to maintain its natural color or bloom.

9 Claims, 1 Drawing Sheet

METHOD OF SUBSTANTIALLY REDUCING HAZARDOUS PATHOGENS ON THE SURFACE OF FOOD PRODUCTS

FIELD OF INVENTION

This invention relates to food science and more particularly to methods of reducing or eliminating hazardous pathogens on the surface of food products.

BACKGROUND OF INVENTION

There is an increasing concern over the occurrence of hazardous pathogens in and on food products. During the past fifteen years major efforts have been made to develop techniques for intercepting microorganisms on meat, poultry and post-harvest seafood products.

Recently efforts have been made to prevent the contamination of animals prior to slaughter as well as the application of various treatments during and after slaughter and during processing to remove potential pathogens from the food supply.

Some of the techniques for accomplishing the above include irradiation, various organic acids, and selected types of phosphate rinses, intense light treatment, and the like for reducing pathogenic bacteria, and in some cases spoilage bacteria, from meat, poultry, and seafood products.

CONCISE EXPLANATION OF PRIOR ART

U.S. Pat. No. 4,045,579 to Alan Barde Rogers is considered of interest in that it discloses a process for pasteurizing the surface of raw poultry by dipping the same in oil having a temperature of 180–315 degrees Fahrenheit for a period of 10 to 60 seconds to reduce surface bacteria without materially affecting the natural bloom of poultry.

U.S. Pat. No. 4,636,395 to Albert H. Robinson, Jr., et al, is considered of interest in that it discloses a method and apparatus for pasteurizing pieces of food by sequentially passing the same in direct contact with pasteurizing temperatures and similarly rapidly cooling to near ambit temperature.

U.S. Pat. No. 4,279,059 to Maynard E. Anderson, et al, is considered of interest in that it discloses a carcass cleaning unit with a pair of oscillating spray bar assemblies equipped with a plurality of nozzles arranged to collectively contact all surfaces of a carcass when it passed therethrough.

U.S. Pat. No. 3,548,737 to Monroe E. Evans is considered of general interest in that it discloses a continuous large volume heating apparatus for freeing ground, high-fat and high-bulk density, organic feed meal particles of salmonella without affecting the moisture and nutritional content of such particles.

U.S. Pat. Nos. 1,146,589 to George C. Morrison and 3,135,016 to Martin R. Ekstam, et al, are both considered of interest in that they disclose the use of steam on carcasses of animals as they move on a conveyor to remove hair from the carcass.

U.S. Pat. Nos. 2,783,496 to Brice L. Thomas and 1,254,248 to Thomas K. Lowry disclose two additional dehairing and conveying systems for animal carcasses while U.S. Pat. Nos. 3,631,563 to Bryan T. Snowden, 3,744,088 to Bryan T. Snowden, and 3,670,365 to Janus J. Dillon show the use of steam in removing feathers from poultry carcasses.

BRIEF DESCRIPTION OF INVENTION

After much research and study into the above mentioned problems, the present invention has been developed whereby the application of super-heated steam to the surface of fresh and processed meat, poultry and seafoods substantially reduces, and some cases eliminates vegetative microorganisms form these foods.

Super heated steam is, of course, defined as a vapor heated beyond its saturation point. The use of super heated steam in the process of the present invention give relatively rapid or instantaneous pasteurization of all surfaces without harm sufficient to effect the quality of the product.

The present invention also entails specific application systems for the injection of super heated steam onto all surfaces including within the porous areas of flesh. These applications include, but are not limited to, the injection of super heated steam on the exterior and interior surfaces of beef, pork, lamb, veal, turkey, chicken, fish, and shell fish carcasses as well as the components derived from the muscles of these foods. In all cases the exterior surface of the treated food is immediately cooled with a chilled fluid.

Laboratory studies have concluded that the effect of steam heated to at least 212 degrees Fahrenheit at 760 atmospheres injected on the surface of fresh pork hams substantially and significantly reduced the microbial levels. The present invention is a significant innovation in the so-called "war on pathogens" and can be employed throughout the meat, poultry and seafood industries.

In view of the above, it is an object of the present invention to provide a method of substantially reducing or eliminating hazardous pathogens on the surfaces of food products.

Another object of the present invention is to provide a method utilizing super heated steam to substantially reduce or eliminate hazardous pathogens on the surfaces of food products.

Another object of the present invention is to provide a method of substantially reducing hazardous pathogens on the surface of food products by pasteurizing such surfaces with super heated steam followed by a cool rinse.

Another object of the present invention is to provide a method of substantially reducing or eliminating hazardous pathogens on the surface of food products by spraying such surfaces with super heated steam followed by immediate cooling with 35 to 40 degree Fahrenheit water or water/citric acid solution.

Another object of the present invention is to provide a method for pasteurizing the surfaces of food products while preserving the raw tissue bloom.

Other objects and advantages of the present invention will become apparent and obvious from a study of the following description and the accompanying drawings which are merely illustrations of such invention.

DETAILED DESCRIPTION OF INVENTION

Figure 1:
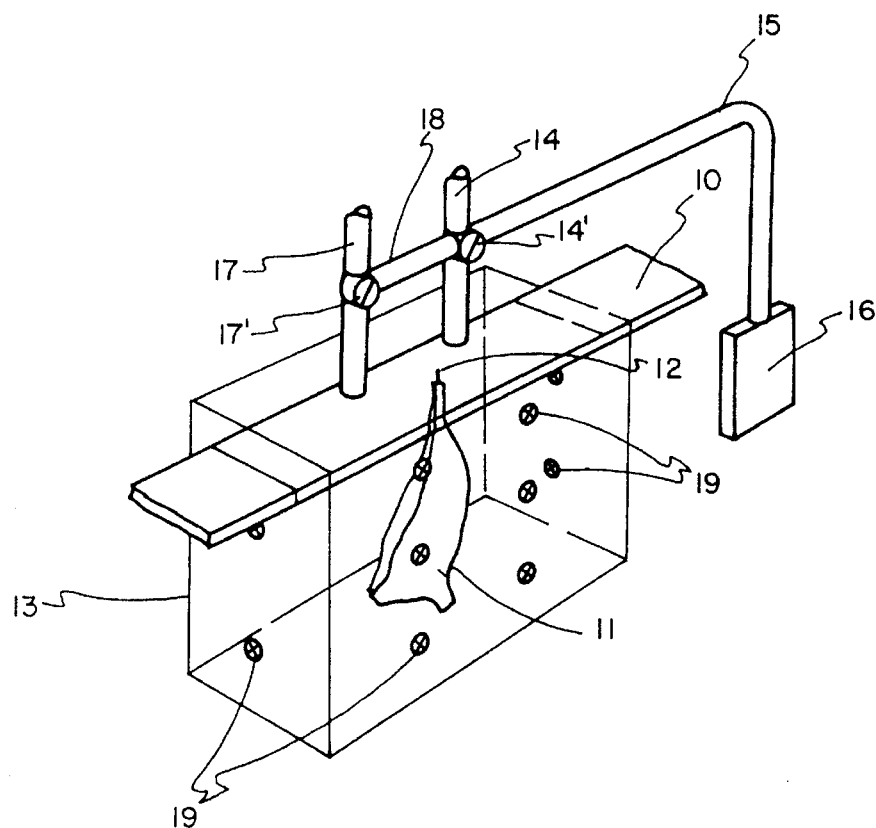
FIG. 1 is a somewhat schematic view of the pasteurizing station for whole carcasses.

With further reference to the drawings, a conveyor 10 in the form of a track has hooks or other suspension means 12 operatively connected thereto for supporting carcasses 11 as they are treated in accordance with the method of the present invention.

The conveyorized track 10 passes through a treatment cabinet 13. A super heated steam inlet line 14 is operatively connected to cabinet 13. A control valve 14' is operatively mounted in steam line 14 and is connected through control line 15 to control panel 16.

A chilled fluid inlet line 17 is operatively connected to the treatment cabinet 13. A control valve 17' is operatively mounted in inlet line 17. This control valve is operatively connected through control line 18 to control panel 16.

A plurality of spray nozzles 19 are strategically located on the interior of treatment cabinet 13 and are operatively connected to either the steam inlet line 14, the chilled fluid inlet line 17 or to both. The location of the various nozzles 19 and the size of the orifices therein will differ depending on the shape and size of the food product being treated. In any case, the spray from the spray nozzles will cover the entire exposed area of the product during treatment.

Since conveyors, nozzle orifice sizes, super heated steam valves, chilled fluid control valves and the associated control panel operatively connected to such valves are all well known to those skilled in the art, further detailed discussion of the same is not deemed necessary.

The treatment cabinet 13 shown in FIG. 1 is sized for carcasses and primal cuts of meats.

Figure 2:
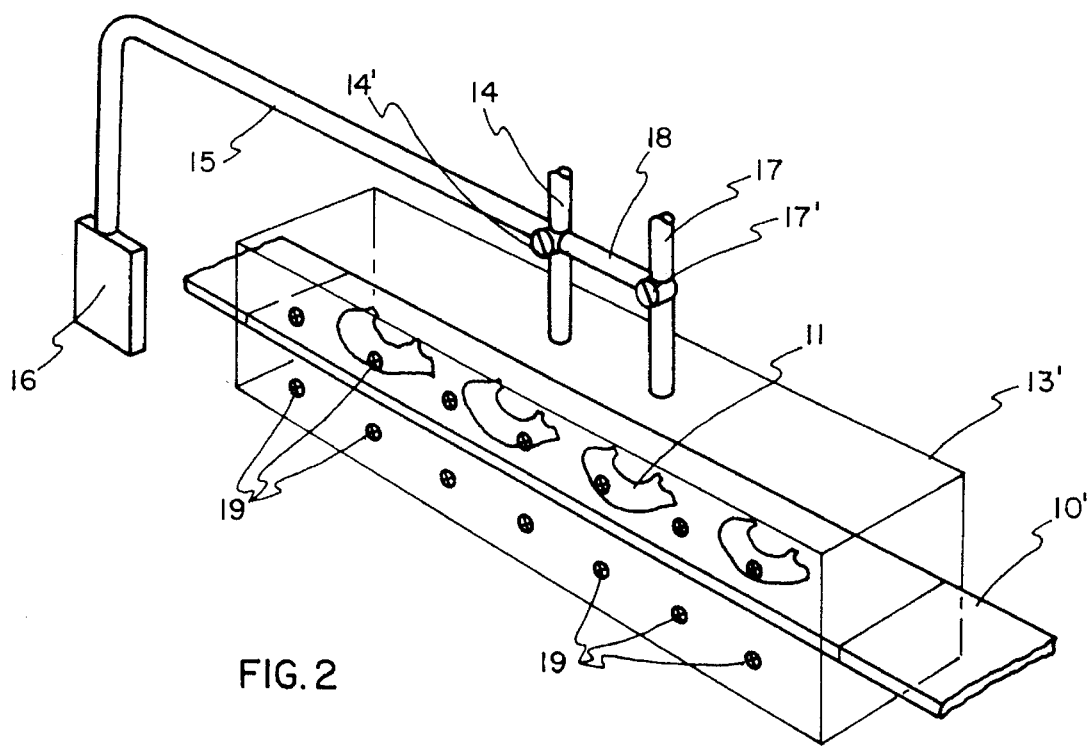
FIG. 2 is a somewhat schematic view of the pasteurizing station for subprimal cuts of meat, poultry parts and seafoods.

The treatment cabinet 13' shown in FIG. 2 is more elongated and is designed for subprimal cuts of meat, poultry parts and seafoods with such food products being supported by the conveyor 10' rather than being suspended therefrom. The control panel 16, the superheated steam inlet line 14 and its associated control valve 14' as well as the chilled fluid inlet line 17 and its associated control valve 17' are the same as described for embodiment of FIG. 1 as are the spray nozzles 19 and their placement and orifice sizes.

After the final carcass wash in the carcass conversion process, such carcass 11 is moved by conveyor 10 into treatment cabinet 13. When properly disposed within such cabinet control panel 16 will, through line 15 open valve 14' in the super heated steam inlet line 14. Super heated steam will then emit from spray nozzles 19 spraying all exposed surfaces of the carcass or carcasses including exterior as well as the interior cavity.

It has been determined that applying super heated steam having a temperature of between 250 and 300 degrees Fahrenheit to exposed surfaces of meat, poultry and seafood for a period of 1 to 5 seconds will give superior results.

The time and temperature parameters are determined according to the specific types and areas of food surfaces being treated. For example, applying super heated steam at approximately 250 degrees Fahrenheit for 5 seconds is required to treat the neck region of a pork or beef carcass while a treatment of super heated steam at the same temperature for 2 seconds will be adequate to treat the cut surfaces of a beef round. Certain seafoods may require as little as 1 second of treatment at 250 degrees to prevent discoloration and to maintain the natural bloom.

In each of the above examples, the super heated steam spraying from nozzles 19 will uniformaly apply such steam to all exposed surfaces during the time set forth. This will substantially reduce, and in some cases eliminate, vegetative pathogenic and spoilage bacteria.

Immediately following the super heated steam treatment, the product is cooled by spraying all exposed surfaces including internal cavities with either water or a solution of water with 1.5 percent citric acid, by volume, for a period of 5 to 10 seconds. This will preserve the raw tissue color or bloom. The citric acid solution will provide an additional, "hurdle" for bacteria.

From the above, it can be seen that the above invention substantially reduces or eliminates vegetative micro-organisms on all exposed surfaces of the food products being treated by the application of super heated steam for a short period of time immediately followed by cooling with a chilled fluid. The food product is then conveyed to final processing station for ultimate distribution to retail end users.

The present invention may, of course, be carried out in other specific ways than those herein set forth without departing from the spirit and essential characteristics of such invention. The present embodiments are, therefore, to be considered in all respects as illustrative and not restrictive, and all changes coming within the meaning and equivalency range of the appended claims are intended to be embraced therein.

What is claimed is:

1. A method of substantially reducing or eliminating hazardous pathogens from the surfaces of a food product selected from the group consisting of fresh and processed meat, poultry, and seafood, the method comprising: moving the food product to be treated into a treatment enclosure; disposing a plurality of spray nozzles within said enclosure adjacent said food product to allow all surfaces to be exposed to fluids emanating from said nozzles; applying super heated steam through said nozzles onto all surfaces of said food product for a predetermined period of time sufficient to substantially reduce or eliminate hazardous pathogens from the surfaces of said food product followed by an immediate application of a cooling fluid to all surfaces of said food product; and moving the food products from said treatment enclosure for final processing and distribution to an end user.

2. The method of claim 1 wherein said steam is super heated to between 250 and 300 degrees Fahrenheit.

3. The method of claim 1 wherein said cooling fluid is applied through spray nozzles.

4. The method of claim 3 wherein said cooling fluid is at a temperature between 35 and 40 degrees Fahrenheit.

5. The method of claim 4 wherein said cooled fluid is sprayed onto the surfaces of the food product for a period of between 5 and 10 seconds.

6. The method of claim 1 wherein said cooling fluid is water at a temperature of between 35 and 40 degrees Fahrenheit.

7. The method of claim 1 wherein said cooling fluid is chilled water.

8. The method of claim 1 wherein said cooling fluid is a solution of water and citric acid at a temperature of between 35 and 40 degrees Fahrenheit.

9. The method of claim 8 wherein the said cooling fluid is a solution of water and approximately 1.5 percent, by weight, citric acid.

\* \* \* \* \*